United States Patent
Yamamoto et al.

(10) Patent No.: US 10,622,635 B2
(45) Date of Patent: Apr. 14, 2020

(54) NONAQUEOUS ELECTROLYTE BATTERY

(71) Applicant: KABUSHIKI KAISHA TOSHIBA, Minato-ku (JP)

(72) Inventors: Dai Yamamoto, Kashiwazaki (JP); Yuki Watanabe, Kashiwazaki (JP); Hidesato Saruwatari, Kashiwazaki (JP); Kazuya Kuriyama, Saku (JP); Hideki Satake, Kashiwazaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 206 days.

(21) Appl. No.: 15/690,326

(22) Filed: Aug. 30, 2017

(65) Prior Publication Data

US 2017/0365860 A1 Dec. 21, 2017

Related U.S. Application Data

(63) Continuation of application No. 14/476,026, filed on Sep. 3, 2014, now Pat. No. 9,780,378.

(30) Foreign Application Priority Data

Sep. 11, 2013 (JP) .................................. 2013-188861
Aug. 27, 2014 (JP) .................................. 2014-172756

(51) Int. Cl.
*H01M 4/62* (2006.01)
*H01M 4/131* (2010.01)
(Continued)

(52) U.S. Cl.
CPC .......... *H01M 4/628* (2013.01); *H01M 4/131* (2013.01); *H01M 4/1391* (2013.01);
(Continued)

(58) Field of Classification Search
CPC ......... H01M 10/0525; H01M 10/0568; H01M 10/0569; H01M 10/446; H01M 2220/20;
(Continued)

(56) References Cited

U.S. PATENT DOCUMENTS

2010/0178570 A1 7/2010 Kozono
2014/0162117 A1 6/2014 Matsuno et al.

FOREIGN PATENT DOCUMENTS

CN 102867990 A 1/2013
JP 11-67266 3/1999
(Continued)

OTHER PUBLICATIONS

K. Tasaki. Solvent Decompositions and Physical Properties of Decomposition Compounds in Li-Ion Battery Electrolytes Studied by DFT Calculations and Molecular Dynamics Simulations, J. Phys. Chem. B 2005, 109, 2920-2933.*
(Continued)

*Primary Examiner* — Carlos Barcena
(74) *Attorney, Agent, or Firm* — Oblon, McClelland, Maier & Neustadt, L.L.P.

(57) ABSTRACT

According to one embodiment, there is provided a nonaqueous electrolyte battery. The nonaqueous electrolyte battery includes a positive electrode, a negative electrode and a nonaqueous electrolyte. The negative electrode includes a negative electrode material layer. The negative electrode material layer includes a negative electrode active material capable of absorbing and releasing lithium at a potential of 0.78 V (vs. Li/Li$^+$) or more. A film containing a compound having a propylene glycol backbone is formed on at least a part of a surface of the negative electrode material layer. A content of the compound having the propylene glycol backbone in the film is 2 μmol to 40 μmol per g of a weight of the negative electrode material layer.

16 Claims, 2 Drawing Sheets

(51) Int. Cl.
*H01M 4/1391* (2010.01)
*H01M 4/485* (2010.01)
*H01M 4/36* (2006.01)
*H01M 10/44* (2006.01)
*H01M 10/0569* (2010.01)
*H01M 10/0525* (2010.01)
*H01M 10/0568* (2010.01)

(52) U.S. Cl.
CPC .......... *H01M 4/366* (2013.01); *H01M 4/485* (2013.01); *H01M 10/0525* (2013.01); *H01M 10/0568* (2013.01); *H01M 10/0569* (2013.01); *H01M 10/446* (2013.01); *H01M 2220/20* (2013.01); *H01M 2300/0028* (2013.01); *Y02T 10/7011* (2013.01); *Y10T 29/49108* (2015.01)

(58) Field of Classification Search
CPC ......... H01M 2300/0028; H01M 4/131; H01M 4/1391; H01M 4/366; H01M 4/485; H01M 4/628
See application file for complete search history.

(56) References Cited

FOREIGN PATENT DOCUMENTS

| | | |
|---|---|---|
| JP | 2007-305447 | 11/2007 |
| JP | 2007-305447 A | 11/2007 |
| JP | 2012-59410 | 3/2012 |
| JP | 2013-45759 | 3/2013 |

OTHER PUBLICATIONS

R. Dedryvere, L. Gireaud, S. Grugeon, S. Laruelle, J.-M. Tarascon, D. Gonbeau. Characterization of Lithium Alkyl Carbonates by X-ray Photoelectron Spectroscopy: Experimental and Theoretical Study, J. Phys. Chem. B 2005, 109, 15868-15875.*

K. Xu, G. V. Zhuang, J. L. Allen, U. Lee, S. S. Zhang, P. N. Ross, Jr., T. R. Jow. Syntheses and Characterization of Lithium Alkyl Mono- and Dicarbonates as Components of Surface Films in Li-Ion Batteries, J. Phys. Chem. B 2006, 110, 7708-7719.*

M. R. Wagner, P. R. Raimann, A. Trifonova, K.-C. Moeller, J. O. Besenhard, M. Winter. Electrolyte Decomposition Reactions on Tin- and Graphite-Based Anodes are Different, Electrochemical and Solid-State Letters 2004, 7 (7), A201-A205.*

Extended Search Report dated Jan. 30, 2015 in European Patent Application No. 14183713.8.

Doron Aurbach, et al., "The Correlation Between the Surface Chemistry and the Performance of Li-Carbon Intercalation Anodes for Rechargeable 'Rocking-Chair' Type Batteries", Journal of The Electrochemical Society, vol. 141, Issue 3, 1994, 10 pages.

Combined Office Action and Search Report dated Apr. 13, 2016 in Chinese Patent Application No. 201410457773.2 with English translation of category of cited documents.

* cited by examiner

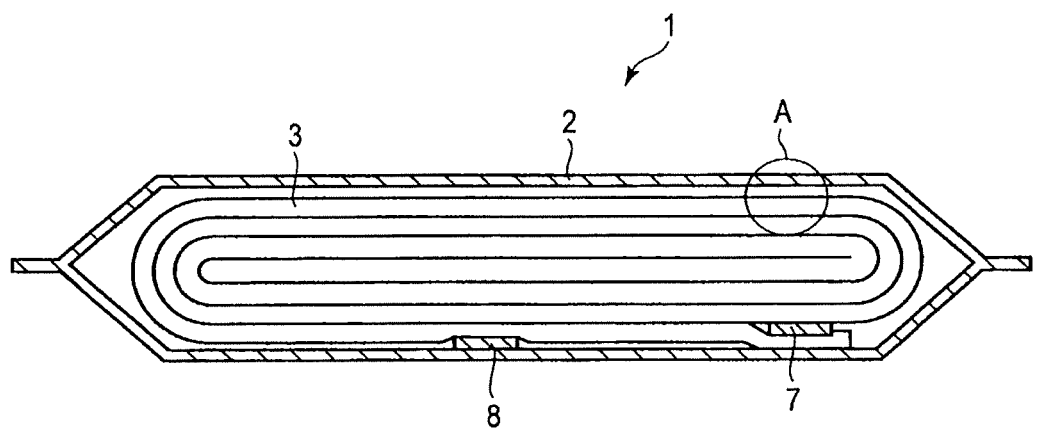
F I G. 1
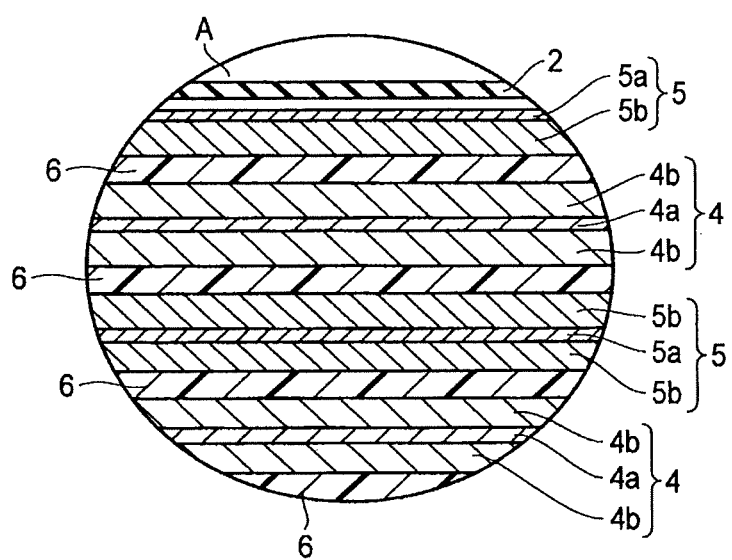
F I G. 2

US 10,622,635 B2

NONAQUEOUS ELECTROLYTE BATTERY

CROSS-REFERENCE TO RELATED APPLICATIONS

This application is a continuation application of U.S. Ser. No. 14/476,026 filed Sep. 3, 2014, now allowed; and is based upon and claims the benefit of priority from the Japanese Patent Applications No. 2013-188861, filed Sep. 11, 2013; and No. 2014-172756, filed Aug. 27, 2014, the entire contents of all of which are incorporated herein by reference.

FIELD

Embodiments described herein relate generally to a nonaqueous electrolyte battery and a production method of a nonaqueous electrolyte battery.

BACKGROUND

A nonaqueous electrolyte secondary battery in which charge and discharge is conducted by moving Li ions between a negative electrode and a positive electrode has recently been proposed for use as a large size power storage device for an electric vehicle (EV), hybrid electric vehicle (HEV), or a stationary power generation system such as a solar power generation system, in consideration of energy issues, environmental issues, and the like.

Such a nonaqueous electrolyte secondary battery is required to have properties such as a useful lifetime longer time than that of small-sized nonaqueous electrolyte batteries used for a cell phone, laptop computer, or the like, and entail a lower risk of combustion or explosion in the unlikely event of an accident.

It is known that in a nonaqueous electrolyte battery using a carbon negative electrode, carbonates, which are structural components of an electrolytic solution, are reductively decomposed on a surface of a negative electrode active material to form a coating film called "SEI" (solid electrolyte interface) upon initial charge and discharge. After the formation of the SEI, it is possible to prolong the life of the battery, because decomposition of a solvent on the surface of the negative electrode active material is inhibited.

Furthermore, the life of a battery greatly depends on the condition of the SEI coating film, and it is considered that an SEI coating film which is formed to be thinner and denser is generally better.

In a lithium ion secondary battery using the carbon negative electrode, however, a solvent is positively decomposed upon initial charge and discharge, and thus a large amount of SEIs are formed. If a large amount of SEIs are formed, a resistance of the nonaqueous electrolyte battery may be increased.

The term nonaqueous electrolyte battery includes, for example, nonaqueous electrolyte batteries that use a lithium titanium composite oxide as a negative electrode material, in addition to lithium ion secondary batteries that use a carbon negative electrode.

In the lithium titanium composite oxide, the size and the structure of the crystal lattice thereof are hardly changed upon absorption and release of Li ions, and thus it is known to be a material with excellent cycle stability. In addition, if the battery is shorted by accident, the site of the short quickly enters a high-resistance discharged state, and thus abnormal heating of the battery, caused by a large current flow, can also be prevented. When the lithium titanium composite oxide is used as the active material, accordingly, a battery which is excellent in both the cycle stability and the safety can be produced.

Furthermore, in a nonaqueous electrolyte battery using the lithium titanium composite oxide as a negative electrode material, rapid charging and discharging can be stably conducted.

In the battery using the lithium titanium composite oxide as the active material, however, it is more difficult to form SEI upon the initial charge and discharge, compared to batteries using the carbon negative electrode. It can be considered that this is caused because in the lithium titanium composite oxide, a potential at which the absorption and release of Li ions occurs is higher than that in the carbon negative electrode, and thus a potential, at which reducibility satisfactory for forming the SEI is generated, is not attained in the composite oxide. The battery using the lithium titanium composite oxide has, accordingly, an active material with a high cycle stability and a low initial increase of resistance, but if no measures are taken, an increase of resistance or gas generation is caused due to decomposition of an electrolytic solution during cycles or storage, and to development of a coating film due to the decomposition of the electrolytic solution may result.

BRIEF DESCRIPTION OF THE DRAWINGS

FIG. 1 is a cross-sectional view showing one example of a nonaqueous electrolyte battery according to a first embodiment;

FIG. 2 is an enlarged cross-sectional view of a part A of FIG. 2; and

DETAILED DESCRIPTION

Figure 3:
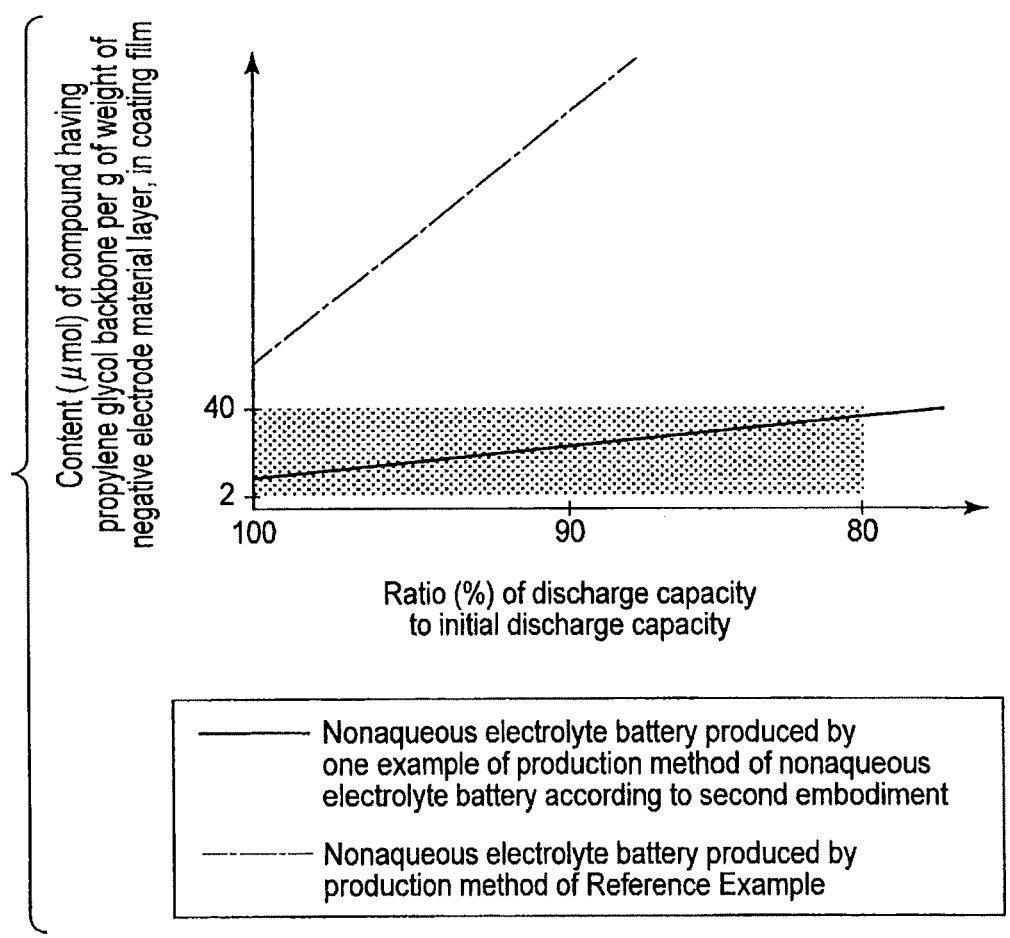
FIG. 3 is a graph schematically showing a relationship between a content of a compound having a propylene glycol backbone included in a coating film and a discharge capacity in an embodiment and Reference Example.

In general, according to one embodiment, there is provided a nonaqueous electrolyte battery. The nonaqueous electrolyte battery includes a positive electrode, a negative electrode and a nonaqueous electrolyte. The negative electrode includes a negative electrode current collector and a negative electrode material layer formed on the negative electrode current collector. The negative electrode material layer includes a negative electrode active material capable of absorbing and releasing lithium at a potential of 0.78 V (vs. Li/Li$^+$) or more. A film containing a compound having a propylene glycol backbone represented by the following formula (1) is formed on at least a part of a surface of the negative electrode material layer.

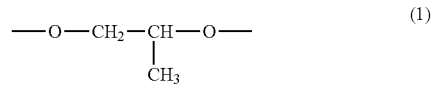

(1)

A content of the compound having the propylene glycol backbone in the film is 2 μmol to 40 μmol per g of a weight of the negative electrode material layer.

The embodiments will be explained below with reference to the drawings. In this case, the structures common to all embodiments are represented by the same symbols and duplicated explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, there is provided a nonaqueous electrolyte battery. The nonaqueous electrolyte battery includes a positive electrode, a negative electrode and a nonaqueous electrolyte. The negative electrode includes a negative electrode current collector and a negative electrode material layer formed on the negative electrode current collector. The negative electrode material layer includes a negative electrode active material capable of absorbing and releasing lithium at a potential of 0.78 V (vs. Li/Li$^+$) or more. A film containing a compound having a propylene glycol backbone represented by the following formula (1) is formed On at least a part of a surface of the negative electrode material layer.

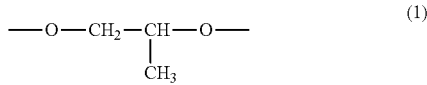

(1)

A content of the compound having the propylene glycol backbone in the film is 2 μmol to 40 μmol per g of a weight of the negative electrode material layer.

A compound having a propylene glycol backbone can be, for example, represented by the following general formula (2):

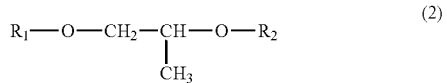

(2)

wherein R$^1$ and R$^2$ may be the same or different, and each is selected from the group consisting of, for example, an alkyl group, a carbonyl group, hydroxyl group, an alkyl lithium group, an ester compound of phosphoric acid and lithium. R$^1$ and R$^2$ are originated from a trace amount of moisture in the nonaqueous electrolyte battery, surface functional groups of an active material, and by-products of a nonaqueous electrolyte component.

This coating film is insoluble in water and a nonaqueous solvent used in a nonaqueous electrolyte. Therefore, the coating film can stably exist in the nonaqueous electrolyte battery.

In the nonaqueous electrolyte battery according to the first embodiment, the content of the compound having the propylene glycol backbone in the coating film is from 2 μmol to 40 μmol per g of the weight of a negative electrode material layer, which inhibits a reaction between a negative electrode active material and the nonaqueous electrolyte while preventing an increase of the batter resistance; as a result, self-discharge and gas generation caused by the reaction can be inhibited. The reason the increase of the battery resistance can be inhibited in the nonaqueous electrolyte battery according to the first embodiment can be considered, without wishing to be bound by any theory, because the reaction between the negative electrode active material and the nonaqueous electrolyte can be inhibited, and furthermore a sufficient Li ion path can be provided by the amount of the coating film described above.

On the other hand, in a nonaqueous electrolyte battery in which the content of the compound having the propylene glycol backbone in the coating film is less than 2 μmol per g of the weight of the negative electrode material layer, the reaction between the negative electrode active material and the nonaqueous electrolyte cannot be sufficiently inhibited. In a nonaqueous electrolyte battery in which the content of the compound having the propylene glycol backbone in the coating film is more than 40 μmol per g of the weight of the negative electrode material layer, the resistance of the coating film is increased, and thus it is difficult to inhibit the increase of the battery resistance.

The content of the compound having the propylene glycol backbone in the coating film is more preferably from 5 μmol to 20 μmol per g of the weight of the negative electrode material layer. In a nonaqueous electrolyte battery in which the content of the compound having the propylene glycol backbone in the coating film is within the range described above, the reaction between the negative electrode active material and the nonaqueous electrolyte can be further inhibited while the battery resistance is kept low. The content of the compound having the propylene glycol backbone in the coating film is further more preferably from 7 μmol to 14 μmol per g of the weight of the negative electrode material layer.

The coating film, formed on the surface of a negative electrode, can further include a compound having an alkoxyl group such as an ethoxy group. In the nonaqueous electrolyte battery further according to the first embodiment in which the coating film formed on the surface of the negative electrode further includes the compound having the alkoxyl group, the reaction between the negative electrode active material and the nonaqueous electrolyte can be further inhibited.

Whether or not the coating film is formed on the negative electrode material layer in the nonaqueous electrolyte battery can be determined by, for example, XPS (X-ray photoelectron spectroscopy) measurement. XPS measurement involves analysis of a surface composition using X-rays, which can investigate a state of bonded elements on a surface, and further can calculate a ratio of the elements. According to the XPS, any fluctuation in the composition of the surface can be measured in a depth direction while etching is performed, and thus formation of the coating film can be confirmed by a relative abundance of carbon (C) compared to other elements (such as Li, O, F and P), when a coating film including an organic component is formed on electrodes.

The content of the compound having the propylene glycol backbone in the coating film, formed on the surface of the negative electrode, per g of the weight of the negative electrode material layer can be quantified, for example, by the following method.

First, a nonaqueous electrolyte battery to be examined is prepared. The target nonaqueous electrolyte battery has a capacity of 80% or more of the nominal capacity. A capacity retention ratio of the battery is evaluated by the following method. First, a battery is charged up to the upper limit operating voltage. At this time, a current value is a current value corresponding to a 0.2 C rate obtained from the nominal capacity. After the voltage reaches the upper limit operating voltage, the voltage is held for 3 hours. After the charge and the holding of the voltage, discharge is conducted at a 0.2 C rate until the voltage reaches the lower limit operating voltage, and a discharge capacity is measured.

Capacity retention ratio is defined as the ratio of the resulting capacity to the nominal capacity. The state of charge of the battery may be any state.

Next, in an inert gas atmosphere, the battery is disassembled, and a part of the negative electrode is taken out. For example, the battery is disassembled in a glove box with an argon gas atmosphere, an electrolytic solution is taken out therefrom, and a negative electrode in an electrode group is cut out.

Next, the cut-out negative electrode is washed with a solvent. As the solvent, a linear carbonate (such as dimethyl carbonate, ethyl methyl carbonate or diethyl carbonate) or acetonitrile may be used. After washing, the atmosphere is turned into a vacuum state while the inert gas atmosphere is maintained, thereby drying the negative electrode. The negative electrode can be dried, for example, at 50° C. in a vacuum for 10 hours.

Next, a part of the negative electrode material layer including a coating layer is peeled off from the dried negative electrode. At this time, the negative electrode material layer is peeled off from the negative electrode current collector so that the surface of the negative electrode current collector is exposed. Next, a weight of the peeled negative electrode material layer is measured.

Subsequently, the peeled negative electrode material layer is immersed in heavy water, and a coating film formed on the negative electrode material layer is extracted. Next, to the resulting extract is added, for example, maleic acid as an internal standard substance in a fixed concentration to prepare a sample for measurement. After the preparation of the sample for measurement, the sample is allowed to stand, for example, at ordinary temperature for 24 hours. The sample for measurement is put in an NMR apparatus, and $^1$H-NMR measurement is conducted, whereby an amount of each component can be quantified from a peak with a standard substance. An amount of substance for the compound having the propylene glycol backbone included in the coating film formed on the peeled negative electrode material layer can be measured by the $^1$H-NMR measurement conducted as in the manner described above.

The thus measured amount of substance for the compound having the propylene glycol backbone was divided by the weight (the weight previously measured) of the peeled negative electrode material layer, whereby the content of the compound having the compound having the propylene glycol backbone per g of the weight of the negative electrode material layer can be calculated.

A content of the compound having the alkoxyl group in the coating film can also quantified at the same time as the content of the compound having the propylene glycol backbone is quantified, for example, by the $^1$H-NMR measurement explained above.

Next, the nonaqueous electrolyte battery according to the first embodiment will be explained in detail.

The nonaqueous electrolyte battery according to the first embodiment includes a positive electrode, a negative electrode, and a nonaqueous electrolyte.

The positive electrode can include a positive electrode current collector and a positive electrode material layer formed on the positive electrode current collector. The positive electrode material layer may be formed on both main surfaces of the positive electrode current collector, or on one surface thereof.

The positive electrode material layer can include a positive electrode active material, and optionally a conductive agent and a binder.

The positive electrode current collector can include a part where no positive electrode material layer is carried on the collector, in which the positive electrode material layer is not formed on the surface of the collector. The part of the collector on which no positive electrode material layer is supported can serve as a positive electrode tab.

The negative electrode includes a negative electrode current collector and a negative electrode material layer formed on the negative electrode current collector. The negative electrode material layer may be formed on both main surfaces of the negative electrode current collector, or on one surface thereof.

The negative electrode material layer includes a negative electrode active material capable of absorbing or releasing lithium at a potential of 0.78 V (vs. Li/Li$^+$) or more. The negative electrode material layer may include one or more of such a negative electrode active materials. The negative electrode material layer may further include optionally the conductive agent and the binder.

The coating film including the compound having the propylene glycol backbone, explained above, is formed on at least a part of the surface of the negative electrode material layer.

The negative electrode current collector can include a part on which no negative electrode material layer supported, i.e., a part where the negative electrode material layer is not formed on the surface of the collector. Such part with no negative electrode material layer on the collector can serve as a negative electrode tab.

The positive electrode and the negative electrode are disposed so that the positive the electrode material layer faces the negative electrode material layer, thereby forming an electrode group. A member, such as a separator, which is capable of permeating lithium ions but blocks electricity can be disposed between the positive electrode material layer and the negative electrode material layer.

The electrode group may have various structures. The electrode group may have a stack structure or a wound type structure. The stack structure has, for example, a structure in which multiple negative electrodes and multiple positive electrodes are laminated with a separator inserted between the negative electrode and the positive electrode. The electrode group having the wound type structure may have, for example, a can type structure in which a laminate of the negative electrode, the positive electrode, and the separator inserted between them is wound, or a flat type structure obtained by pressing the can type structure.

The positive electrode tab can be electrically connected to a positive electrode terminal. Similarly, the negative electrode tab can be electrically connected to a negative electrode terminal. The positive electrode terminal and the negative electrode terminal can be extended from the electrode groups.

The electrode groups are housed in a case. The case may have a structure in which the positive electrode terminal and the negative electrode terminal can be extended outward. Alternatively, the case may be formed so that it has two external terminals and each of the terminals is electrically connected to each of the positive electrode terminal and the negative electrode terminal.

The nonaqueous electrolyte is contained in the case, and the electrode group can be impregnated with the electrolyte.

A material of each member which can be used in the nonaqueous electrolyte battery according to the first embodiment will be explained below.

1. Negative Electrode

The negative electrode active material capable of absorbing and releasing lithium at a potential of 0.78 V (vs. Li/Li$^+$) or more is, for example, a negative electrode active material capable of absorbing and releasing lithium at a potential of 0.78 V (vs. Li/Li$^+$) to 3.0 V (vs. Li/Li$^+$). Examples of such a negative electrode active material may include metal oxides, metal sulfides, metal nitrides, and alloys. Negative electrode active materials capable of absorbing and releasing lithium at a potential of 1.0 V (vs. Li/Li$^+$) to 2.5 V (vs. Li/Li$^+$) are preferable.

Examples of the metal oxide may include titanium-containing metal composite oxides, niobium composite oxides, tin-based oxides such as $SnB_{0.4}P_{0.6}O_{3.1}$ or $SnSiO_3$. Of these, the titanium-containing metal composite oxides and the niobium composite oxides are preferable.

Examples of the titanium-containing metal composite oxide may include lithium titanium oxide, titanium-based oxides, and lithium titanium composite oxides in which a part of elements forming the lithium titanium oxide is substituted by different elements.

Examples of the lithium titanium oxide may include lithium titanate (such as $Li_{4+x}Ti_5O_{12}$) having a spinel structure (hereinafter referred to as "LTO") and lithium titanate (such as $Li_{2+y}Ti_3O_7$) having a ramsdellite structure. In the formulae described above, x and y are values which vary due to charge or discharge of a battery, and each satisfies a relationship represented by an inequality: $-1 \leq x \leq 3$ or $0 \leq y \leq 3$.

Examples of the titanium-based oxide may include $TiO_2$, monoclinic β-type titanium composite oxides, and metal composite oxides including Ti and at least one element selected from the group consisting of V, Sn, Cu, Ni, Co and Fe. Of these, the monoclinic β-type titanium composite oxide is preferably used.

The $TiO_2$ may include, for example, titanium composite oxides having an anatase type structure or a rutile type structure (α-$TiO_2$ or γ-$TiO_2$).

The monoclinic β-type titanium composite oxide refers to a titanium composite oxide having a crystal structure of monoclinic titanium dioxide. The crystal structure of the monoclinic titanium dioxide mainly belongs to a space group C2/m. Hereinafter the monoclinic p-type titanium composite oxide is referred to as "$TiO_2(B)$." $TiO_2(B)$ encompasses the oxide in which a part of the constituent elements is substituted by different elements such as Li.

The metal composite oxide including Ti and at least one element selected from the group consisting of V, Sn, Cu, Ni, Co and Fe may include $TiO_2$—$V_2O_5$, $TiO_2$—$P_2O_5$—$SnO_2$, and $TiO_2$—$P_2O_5$-MeO, wherein Me is at least one element selected from the group consisting of Cu, Ni, Co and Fe. The metal composite oxide preferably has a structure in which a crystal phase and an amorphous phase coexist, or a structure in which an amorphous phase exists alone.

Examples of the niobium composite oxide may include $Nb_2O_5$ and $Nb_2TiO_7$.

Examples of the metal sulfide may include titanium-based sulfides such as $TiS_2$, molybdenum-based sulfides such as $MoS_2$, and iron-based sulfides such as FeS, $FeS_2$, and $Li_xFeS_2$ wherein $0 \leq x \leq 4$.

Examples of the metal nitride may include lithium-based nitrides such as (Li, Me)$_3$N, wherein Me is a transition metal element.

The negative electrode active material capable of absorbing and releasing lithium at a potential of 0.78 V (vs. Li/Li$^+$) or more is preferably a lithium titanate compound having a spinel structure.

The negative electrode active material preferably has an average particle size of 1 μm or less, and a specific surface area, according to a BET method by $N_2$ gas adsorption, of 5 to 50 m$^2$/g. The negative electrode active material having the average particle size and the specific surface area within the ranges described above has a high utilization rate and a substantially large capacity. The specific surface area can be measured, for example, by using Micromeritics ASPA-2010, available from Shimadzu Corporation, and $N_2$ as an adsorption gas.

The conductive agent is used if necessary to enhance a current collection performance, and to reduce a contact resistance between the active material and the negative electrode current collector. Examples of the conductive agent may include carbon materials such as acetylene black, carbon black and graphite.

The binder is used if necessary to bind the active material and the optional conductive agent to the negative electrode current collector in the negative electrode material layer. Examples of the binder may include polytetrafluoroethylene (PTFE), polyvinylidene fluoride (PVdF), fluorine-containing rubber, and styrene-butadiene rubber.

The negative electrode current collector is preferably formed from a material which is electrically stable within a range of a potential at which lithium ions are absorbed and released in the negative electrode active material. Examples of such a material may include copper, nickel, stainless steel, aluminum, and aluminum alloy. The aluminum alloy preferably includes one or more elements selected from the group consisting of Mg, Ti, Zn, Mn, Fe, Cu and Si.

The negative electrode current collector preferably has a thickness of 5 μm to 20 μm. This makes the negative electrode lighter while the strength thereof is maintained.

The negative electrode is formed, for example, by suspending the negative electrode active material, the binder and the conductive agent in an appropriate solvent to prepare a slurry for forming the negative electrode, coating the surface of the negative electrode current collector with the slurry, drying the obtained coating to form a negative electrode active material layer, and then pressing the layer. The negative electrode can also be formed by forming the negative electrode active material, the binder, and the conductive agent, which is added if necessary, into pellets, forming the negative electrode material layer therefrom, and putting the layer on the negative electrode current collector.

When the slurry for forming the negative electrode is prepared, the negative electrode active material, the conductive agent, and the binder are preferably added in contents of 70% by weight to 96% by weight, 2% by weight to 28% by weight, and 2% by weight to 28% by weight, respectively. When the content of the conductive agent is 2% by weight or more, the current collection performance of the negative electrode material layer can be improved. When the content of the binder is 2% by weight or more, the binding between the negative electrode material layer and the current collector can be sufficient. For those reasons, the combination described above can further improve the cycle characteristic. On the other hand, the contents of the conductive agent and the binder are preferably 28% by weight or less in terms of an increased capacity.

2. Positive Electrode

As the positive electrode active material, for example, oxides, sulfide, or polymers can be used. Examples of the oxide or the sulfide may include manganese dioxide ($MnO_2$), iron oxide, copper oxide, nickel oxide, lithium manganese composite oxide (such as $Li_xMn_2O_4$ or $Li_xMnO_2$), lithium nickel composite oxide (such as $Li_xNiO_2$), lithium cobalt composite oxide (such as $Li_xCoO_2$), lithium nickel cobalt composite oxide (such as $LiNi_{1-y}Co_yO_2$), lithium manganese cobalt composite oxide (such as $Li_xMn_yCo_{1-y}O_2$), lithium manganese nickel composite oxide (such as $Li_xMn_{2-y}Ni_yO_4$) having a spinel structure, lithium phosphorus oxide (such as $Li_xFePO_4$, $Li_xFe_{1-y}Mn_yPO_4$, $Li_xCoPO_4$) having an olivine structure, iron sulfate [$Fe_2(SO_4)_3$], vanadium oxide (such as $V_2O_5$), and lithium nickel cobalt manganese composite oxide, each of which can absorb lithium. In the formulae above, $0<x\le1$ and $0<y\le1$. As the active material, the compounds may be used alone or as a mixture of multiple compounds.

Examples of the polymer may include conductive polymer materials such as polyaniline and polypyrrole, and disulfide polymer materials.

Sulfur (S) or fluorinated carbon can also be used as the positive electrode active material.

Examples of more preferable positive electrode active materials may include lithium manganese composite oxide ($Li_xMn_2O_4$) having a high positive electrode voltage, lithium nickel composite oxide ($Li_xNiO_2$), lithium cobalt composite oxide ($Li_xCoO_2$), lithium nickel cobalt composite oxide ($LiNi_{1-y}Co_yO_2$), lithium manganese nickel composite oxide ($Li_xMn_{2-y}Ni_yO_4$) having a spinel structure, lithium manganese cobalt composite oxide ($Li_xMn_yCo_{1-y}O_2$), lithium iron phosphate ($Li_xFePO_4$), and lithium nickel cobalt manganese composite oxide. In the formulae above, $0<x\le1$ and $0<y\le1$.

Preferable examples of the positive electrode active material when an ambient temperature molten salt is used as the nonaqueous electrolyte of the nonaqueous electrolyte battery may include lithium iron phosphate, $Li_xVPO_4F$ ($0\le x\le1$), lithium manganese composite oxides, lithium nickel composite oxides, and lithium nickel cobalt composite oxides. These compounds have a low reactivity with the ambient temperature molten salt, and thus they can improve the cycle characteristic of the nonaqueous electrolyte battery.

The positive electrode active material preferably has a specific surface area within a range of 0.1 m²/g to 10 m²/g. The positive electrode active material having a specific surface area of 0.1 m²/g or more can sufficiently secure the sites absorbing and release of lithium ions. The positive electrode active material having a specific surface area of 10 m²/g or less can be easily handled in industrial production and can secure a good charge and discharge cycle performance.

The conductive agent is added if necessary to enhance the current collection performance and inhibit the contact resistance between the positive electrode active material and the positive electrode current collector. Examples of the conductive agent may include carbonaceous substances such as acetylene black, carbon black, and graphite.

The binder has an action to bind the positive electrode active material to the positive electrode current collector. Examples of the binder may include polytetrafluoroethylene (PTFE), polyvinylidene fluoride (PVdF) and fluorine-containing rubber.

The positive electrode current collector is preferably an aluminum foil or a foil of aluminum alloy including one or more elements selected from Mg, Ti, Zn, Ni, Cr, Mn, Fe, Cu and Si.

The aluminum foil or the aluminum alloy foil has desirably a thickness of 5 μm to 20 μm, more preferably 15 μm or less. The aluminum foil has preferably a purity of 99% by weight or more. A content of a transition metal such as iron, copper, nickel or chromium in the aluminum foil or the aluminum alloy foil is preferably of 1% by weight or less.

The positive electrode is formed, for example, by suspending the positive electrode active material, the binder and the conductive agent, which is added if necessary, in an appropriate solvent to prepare a slurry for forming the positive electrode, coating the positive electrode current collector with the slurry, drying the obtained coating to form a positive electrode material layer, and then pressing the layer. The positive electrode can also be formed by forming the active material, the binder and the conductive agent, which is added if necessary, into pellets, forming the positive electrode material layer therefrom, and forming the layer on the current collector.

When the slurry for forming the positive electrode is prepared, the positive electrode active material and the binder are preferably added in contents of 80% by weight to 98% by weight and 2% by weight to 20% by weight, respectively. When the content of the binder is 2% by weight or more, sufficient electrode strength can be obtained. When the content is 20% by weight or less, an amount of an insulator in the electrode is decreased, whereby the internal resistance of the nonaqueous electrolyte battery can be decreased.

When the conductive agent is added, the positive electrode active material, the binder and the conductive agent are preferably added in the contents of 77% by weight to 95% by weight, 2% by weight to 20% by weight, and 3% by weight to 15% by weight, respectively. When the content of the conductive agent is 3% by weight or more, the effects described above can be exhibited. When the content is 15% by weight or less, the decomposition of the nonaqueous electrolyte on the surface of the positive electrode conductive agent can be reduced in storage at a high temperature.

3. Separator

The separator may be formed from, for example, a porous film including polyethylene, polypropylene, cellulose or polyvinylidene fluoride (PVdF) or a nonwoven fabric made of a synthetic resin. The porous film formed from polyethylene or polypropylene can be molten at a certain temperature to interrupt the current. The safety of the nonaqueous electrolyte battery using such as film can, accordingly, be further improved.

4. Case

As the case, laminate film containers or metal containers can be used. The shape of the case may be a flat type (thin type), a square type, a cylinder type, a coin type, a button type, a sheet type, or a stack type. The shape and the size of the case can be arbitrarily designed depending on the battery size. For example, a case for small batteries, which is loaded on portable electronic devices and the like, or a case for large batteries, which is loaded on two- to four-wheel cars and the like are used.

The laminate film is a multilayer film formed of a metal layer and a resin layer covering the metal layer. The metal layer is preferably an aluminum foil or an aluminum alloy foil. This can reduce the weight of the battery. The resin layer can reinforce the metal layer. The resin layer may be formed from a polymer such as polypropylene (PP), polyethylene (PE), nylon, or polyethylene terephthalate (PET). The laminate film, forming the case, has a thickness of preferably 0.5 mm or less, more preferably 0.2 mm or less. The laminate film can be formed into a desired shape by heat-sealing.

The metal container may be formed from aluminum or aluminum alloy. The aluminum alloy preferably includes an element such as Mg, Zn or Si. When a transition metal such as Fe, Cu, Ni or Cr is included in the alloy, the content thereof is preferably 1% by weight or less. This can dramatically improve long term reliability under a high temperature environment, and heat radiation. A metal plate forming the metal container has a thickness of preferably 1 mm or less, more preferably 0.5 mm or less, further more preferably 0.2 mm or less.

5. Negative Electrode Terminal

The negative electrode terminal can be formed from aluminum or aluminum alloy including at least one element selected from Mg, Ti, Zn, Mn, Fe, Cu and Si. In order to reduce the contact resistance with the negative electrode current collector, the negative electrode terminal is preferably formed from the same material as used for the negative electrode current collector.

6. Positive Electrode Terminal

The positive electrode terminal is preferably formed from aluminum, or an aluminum alloy including at least one element selected from Mg, Ti, Zn, Ni, Cr, Mn, Fe, Cu and Si. In order to reduce the contact resistance with the positive electrode current collector, the positive electrode terminal is preferably formed from the same material as used for the positive electrode current collector.

7. Nonaqueous Electrolyte

As the nonaqueous electrolyte, a liquid nonaqueous electrolyte or a gelatinous nonaqueous electrolyte can be used. The liquid nonaqueous electrolyte is prepared by dissolving the electrolyte in the nonaqueous solvent. The gelatinous nonaqueous electrolyte is prepared by combining the liquid electrolyte with a polymer material.

The nonaqueous solvent preferably includes propylene carbonate. The content of the propylene carbonate in the nonaqueous solvent is preferably within a range of 5% by volume to 50% by volume based on the volume of the nonaqueous solvent. The nonaqueous electrolyte battery according to the first embodiment, which includes the nonaqueous solvent having propylene carbonate in the content of this range, can provide a coating film capable of further inhibiting both of the self-discharge and the increase of the resistance on the surface of the negative electrode.

The nonaqueous solvent may include organic solvents other than propylene carbonate. Examples of the organic solvent other than propylene carbonate may include cyclic carbonates such as ethylene carbonate (EC) and vinylene carbonate; chain carbonates such as diethyl carbonate (DEC), dimethyl carbonate (DMC), and methyl ethyl carbonate (MEC); cyclic ethers such as tetrahydrofuran (THF), 2methyl tetrahydrofuran (2MeTHF), and dioxolane (DOX); chain ethers such as dimethoxyethane (DME), and diethoxyethane (DEE); γ-butyrolactone (GBL), acetonitrile (AN), and sulfolane (SL). The organic solvents may be included alone or as a mixture thereof in the nonaqueous solvent.

The concentration of the electrolyte in the liquid nonaqueous electrolyte is preferably from 0.5 mol/L to 2.5 mol/L.

The electrolyte preferably includes lithium hexafluorophosphate $LiPF_6$. The electrolyte may include an electrolyte other than $LiPF_6$. In such a case, the content of $LiPF_6$ in the electrolyte is preferably 70 mol % or more. The nonaqueous electrolyte battery according to the first embodiment including the nonaqueous electrolyte in which 70 mol % or more of the electrolyte is formed of $LiPF_6$ can prevent overproduction of a coating film having a propylene glycol backbone, which can further inhibit an increase in the resistance. When the electrolyte other than $LiPF_6$ is included, the inhibition effect of overproduction of the coating film can be further promoted.

Examples of the electrolyte other than $LiPF_6$ may include lithium salts such as lithium perchlorate ($LiClO_4$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonyl imide [$LiN(CF_3SO_2)_2$], lithium N,N-bis(trifluoromethanesulfonyl)imide (LiTFSI), lithium N,N-bispentafluoroethanesulfonyl amide (LiBETI), lithium bis(fluorosulfonyl)imide (LiFSI), lithium difluorophosphate ($LiPF_2O_2$), lithium monofluorophosphate ($LiPFO_3H$), lithium bisoxalatoborate ($LiB(C_2O_4)_2$), lithium difluoro(oxalato)borate ($LiF_2BC_2O_4$), lithium difluoro(trifluoro-2-oxido-2-trifluoromethylpropionato(2-)-0,0)borate ($LiBF_2(OCOOC(CF_3)_2)$), and mixtures thereof.

Examples of the polymer material may include polyvinylidene fluoride (PVdF), polyacrylonitrile (PAN) and polyethylene oxide (PEO).

Next, an example of the nonaqueous electrolyte battery according to the first embodiment will be explained in detail, referring to the drawings.

FIG. 1 is a cross-sectional view showing one example of the nonaqueous electrolyte battery according to the first embodiment. FIG. 2 is an enlarged cross-sectional view of an A part in FIG. 1.

As shown in FIG. 1, a battery 1 includes an case 2, and an electrode group 3 housed in the case 2. Here, as the electrode group 3, a wound type electrode group is used. The case 2 has a bag-like shape. The case 2 further houses a nonaqueous electrolyte (not shown). The electrode group 3 is impregnated with the nonaqueous electrolyte.

The electrode group 3, as shown in FIG. 2, includes positive electrodes 4, negative electrodes 5, and multiple separators 6. The electrode group 3 has a structure in which a laminate is spirally wound. The laminate has a structure in which the separator 6, the positive electrode 4, the separator 6, and the negative electrode 5 are overlapped in this order. The flat wound electrode group is formed by spirally winding the laminate so that the negative electrode is located at the outermost periphery, and then pressing it while it is heated.

The positive electrode 4 includes a positive electrode current collector 4a and positive electrode material layers 4b formed on both surfaces of the positive electrode current collector 4a. The positive electrode material layer 4b includes a positive electrode active material, a binder, and a conductive agent.

The negative electrode 5 includes a negative electrode current collector 5a and negative electrode material layers 5b formed on the both surfaces of the negative electrode current collector 5a, with the exception that on the outermost periphery of the electrode group 3, as shown in FIG. 2, the negative electrode material layer 5b is formed only on the inner surface side of the negative electrode current collector 5a.

The negative electrode material layer 5b includes a negative electrode active material capable of absorbing and releasing lithium at a potential of 0.78 V (vs. $Li/Li^+$) or more.

A coating film including a compound having a propylene glycol backbone, represented by the following formula (1) is formed on the surface of the negative electrode material layer 5b. The coating film is very thin compared to the negative electrode material layer 5b, and thus it is not shown in FIG. 2.

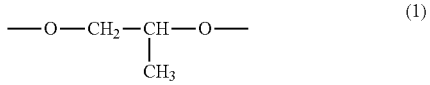

$$\mathrm{-O-CH_2-CH-O-} \atop \mathrm{CH_3} \quad (1)$$

As shown in FIG. 1, a positive electrode terminal 7 is connected to a positive electrode current collector 4a in the vicinity of outer peripheral edge of the electrode group 3. In addition, a negative electrode terminal 8 is connected to a negative electrode current collector 5a in the outermost periphery of the electrode group 3. The positive electrode terminal 7 and the negative electrode terminal 8 extend outward from openings of the case 2.

The nonaqueous electrolyte battery according to the first embodiment, as explained above, has the negative electrode material layer including the negative electrode active material capable of absorbing and releasing lithium at a potential of 0.78 V (vs. Li/Li$^+$) or more, and the coating film including the compound having the propylene glycol backbone in a content of 2 μmol to 40 μmol per g of the weight of the negative electrode material layer. Such a nonaqueous electrolyte battery can inhibit the self-discharge and the increase of the battery resistance. According to the first embodiment, accordingly, the nonaqueous electrolyte battery, which can inhibit the self-discharge and the increase of the battery resistance, and uses the negative electrode active material capable of absorbing and releasing lithium at a potential of 0.78 V (vs. Li/Li$^+$) or more, can be provided.

Second Embodiment

According to a second embodiment, there is provided a production method of a nonaqueous electrolyte battery. The production method includes preparing an electrode group which includes a negative electrode, preparing a nonaqueous electrolyte, housing the electrode group and the nonaqueous electrolyte in a case to produce a battery unit, subjecting the battery unit to initial charging and discharging, charging the battery unit to adjust a state of charge to 20% to 80%, and storing the battery unit in an atmosphere at a temperature of 50° C. to 80° C. The negative electrode comprising a negative electrode current collector and a negative electrode material layer formed on the negative electrode current collector. The negative electrode material layer contains a negative electrode active material capable of absorbing and releasing lithium at a potential of 0.78 V (vs. Li/Li$^+$) or more. The nonaqueous electrolyte includes a nonaqueous solvent containing propylene carbonate in a content of 5% by volume to 50% by volume, and an electrolyte containing LiPF$_6$ in a content of 70 mol % or more and dissolved in the nonaqueous solvent.

The production method of the nonaqueous electrolyte battery according to the second embodiment will be explained in detailed below.

First, an electrode group having a negative electrode is prepared.

The negative electrode includes a negative electrode current collector, and a negative electrode material layer formed on the negative electrode current collector. The negative electrode material layer includes a negative electrode active material capable of absorbing and releasing lithium at a potential of 0.78 V (vs. Li/Li$^+$) or more. The negative electrode can be produced, for example, by the method described in the explanation of the first embodiment.

Subsequently, the electrode group including the negative electrode is produced. The electrode group can further include a positive electrode and a separator. The electrode group can be produced, for example, by the method described in the explanation of the first embodiment.

On the other hand, a nonaqueous electrolyte is prepared. The nonaqueous electrolyte is prepared by dissolving an electrolyte in a nonaqueous solvent.

The nonaqueous solvent used for preparing the nonaqueous electrolyte includes propylene carbonate. The propylene carbonate is mixed with other solvents in a content of 5% to 50% based on the volume of the nonaqueous solvent. When the content of the propylene carbonate is less than 5%, an appropriate amount of a coating film having a propylene glycol backbone cannot be formed. On the other hand, when the content of the propylene carbonate is more than 50%, undesirably, the amount of the coating film having the propylene glycol backbone is increased to form a resistance component, and the viscosity of the nonaqueous electrolyte is increased to reduce an ionic conductivity, thus resulting in increased battery resistance. The other solvent to be mixed with the propylene carbonate may be, for example, at least one solvent selected from the group consisting of cyclic carbonates such as ethylene carbonate (EC) and vinylene carbonate; chain carbonates such as diethyl carbonate (DEC), dimethyl carbonate (DMC), and methyl ethyl carbonate (MEC): cyclic ethers such as tetrahydrofuran (THF), 2methyl tetrahydrofuran (2MeTHF), and dioxolane (DOX): chain ethers such as dimethoxyethane (DME) and diethoxyethane (DEE); γ-butyrolactone (GBL), acetonitrile (AN), and sulfolane (SL).

Subsequently, LiPF$_6$ is dissolved in the thus prepared nonaqueous solvent as the electrolyte to prepare a nonaqueous electrolyte. There is no problem even if the ratio of LiPF$_6$ is 100% in the electrolyte, but another Li salt may be mixed as a supporting electrolyte. As the additional Li salt, the additional electrolytes as explained above can be used. It is preferable, however, that LiPF$_6$ forms 70 mol % or more of the electrolyte. When the salt other than LiPF$_6$ is mixed in a ratio of 30 mol % or more, undesirably, the decomposition of the salt itself or other nonaqueous electrolyte components are promoted, and excessive growth of the coating film may possibly occur.

Subsequently, the thus produced electrode group and the thus prepared nonaqueous electrolyte are enclosed in the case to produce a battery unit.

Next, the produced battery unit is subjected to initial charge and discharge. The battery unit, which has been subjected to the initial charge and discharge, can be further subjected to charge and discharge once or more.

Subsequently, the battery unit, which has been subjected to charge and discharge once or more, is charged. The state of charge of the battery unit is adjusted to 20% to 80% by the charge, whereby the propylene carbonate, LiPF$_6$, and impurities are reacted in the electrolytic solution, and the coating film having the propylene glycol backbone represented by the formula (1) can be formed on the negative electrode material layer. On the other hand, when the state of charge of the battery unit is more than 80% by the charge, the potential of the negative electrode material is reduced, and the coating film including the compound having the propylene glycol backbone represented by the formula (1) is excessively formed. When the state of charge of the battery unit is less than 20% by the charge, the potential of the negative electrode becomes high, and it is difficult to form the coating film including the compound having the propylene glycol backbone represented by the formula (1). It is preferable that the state of charge of the battery unit is adjusted to 25% to 50% by the charge.

Here, the "state of charge" of the battery unit refers to a ratio of a charge capacity of the battery to a chargeable capacity when the battery is used in an operation voltage range. The chargeable capacity is a discharge capacity obtained when the battery unit is charged at a predetermined rate until the voltage of the battery unit reaches a predetermined maximum voltage, and then the battery unit is discharged at a predetermined rate until the voltage of the battery unit reaches a predetermined minimum voltage. The state of charge of the battery unit can be calculated by dividing a capacity obtained when the battery unit is discharged until the voltage of the battery unit reaches a predetermined minimum voltage and then charged, by the chargeable capacity described above.

The battery unit, which has been charged in the manner as described above, is stored in the atmosphere at a temperature of 50° C. to 80° C. When the storing temperature is lower than 50° C., the formation of the coating film on the negative electrode material layer is insufficiently advanced, and the decomposition of the nonaqueous electrolyte, which will occur subsequently, cannot be inhibited. On the other hand, when the storing temperature is higher than 80° C., undesirably, the decomposition of the nonaqueous electrolyte is inhibited too much, and the excessive growth of the coating film and the gas generation occur. The storing at a temperature of 50° C. to 80° C. is preferably performed over 24 hours to 120 hours. When the storing time is shorter than 24 hours, the formation of the coating film on the negative electrode material layer is insufficiently advanced, and the decomposition of the nonaqueous electrolyte, which will occur subsequently, cannot be inhibited. On the other hand, when the storing time is longer than 120 hours, the formation of the coating film is excessively advanced due to the long term storage. The storing of the battery unit at a temperature of 50° C. to 80° C. can be performed, for example, in a thermostatic chamber. Such a treatment can be called, for example, aging.

Based on the production method of the nonaqueous electrolyte battery according to the second embodiment, as explained above, the nonaqueous electrolyte battery according to the first embodiment can be produced.

It is considered that the compound having the propylene glycol backbone represented by the formula (1) can be produced by reacting the propylene carbonate, $LiPF_6$, and the impurities in the nonaqueous electrolyte, as explained above.

When diethyl carbonate (DEC) is contained in the nonaqueous solvent for the nonaqueous electrolyte, according to the production method of the nonaqueous electrolyte battery according to the second embodiment explained above, a coating film further including a compound having an alkoxyl group, specifically an ethoxy group, in addition to the compound having the propylene glycol backbone can be formed.

The content of the compound having the propylene glycol backbone in the coating film, which can be formed in this manner, is not decided only by, for example, the content of the nonaqueous electrolyte component such as the propylene carbonate, and is influenced by various factors. The nonaqueous electrolyte battery according to the second embodiment satisfies the conditions explained above, and thus the nonaqueous electrolyte battery according to the first embodiment can be produced by the method.

The content of the compound having the propylene glycol backbone in the coating film formed on the surface of the negative electrode material layer will be explained in the nonaqueous electrolyte battery produced by one example of the production methods of the nonaqueous electrolyte battery according to the second embodiment and the nonaqueous electrolyte battery produced by the production method of Reference Example, referring to FIG. 3.

FIG. 3 is a graph schematically showing a relationship between a content of the compound having a propylene glycol backbone included in the coating film formed on a negative electrode material layer and a discharge capacity, in the nonaqueous electrolyte battery (a solid line), produced by one example of the production methods of the nonaqueous electrolyte battery according to the second embodiment, and the nonaqueous electrolyte battery (a dashed line), produced by the production method of the Reference Example. The one example of the production methods of the nonaqueous electrolyte battery according to the second embodiment and the production method of the Reference Example have the same conditions except for the ratio of $LiPF_6$ in the electrolyte. In the one example of the production methods of the nonaqueous electrolyte battery according to the second embodiment and the production method of the Reference Example, a powdery lithium titanium oxide ($Li_4Ti_5O_{12}$) having a spinel structure and capable of absorbing and releasing lithium at a potential of 1.55 V (vs. $Li/Li^+$) was used as the negative electrode active material.

As is apparent from FIG. 3, in the nonaqueous electrolyte battery produced by one example of the production methods of the nonaqueous electrolyte battery according to the second embodiment, a coating film, which included the compound having the propylene glycol backbone in a content of 2 μmol to 40 μmol per g of the negative electrode material layer, was formed. When the discharge capacity of the nonaqueous electrolyte battery is 80% or more of the initial discharge capacity, the content of the compound having the propylene glycol backbone in the coating film was not over 40 μmol per g of the negative electrode material layer.

On the other hand, as is apparent from FIG. 3, in the nonaqueous electrolyte battery produced by the production method of Reference Example, a coating film, which included the compound having the propylene glycol backbone in a content of more than 40 μmol per g of the negative electrode material layer, was formed immediately after the production of the nonaqueous electrolyte battery. In addition, as apparent from FIG. 3, the content of the compound having the propylene glycol backbone in the coating film in the nonaqueous electrolyte battery produced by the production method of the Reference Example increased at a faster rate than that in the example of the nonaqueous electrolyte battery according to the first embodiment.

As described above, the nonaqueous electrolyte battery according to the first embodiment can be produced, for example, by the production method of the nonaqueous electrolyte battery according to the second embodiment.

The nonaqueous electrolyte battery, which uses the negative electrode active material, such as the carbonaceous substance, having a potential at which lithium is absorbed and released of less than 0.78 V (vs. $Li/Li^+$), and includes the propylene carbonate in the nonaqueous electrolyte, has high reducibility of the negative electrode active material, and thus the decomposition of the propylene carbonate is aggressively advanced by the initial charge and discharge of the battery unit, which leads to generation of a large amount of SEI. For that reason, in such a nonaqueous electrolyte battery, the amount of SEI far exceeds 40 μmol per g of the weight of the negative electrode material layer, and the content of the compound having the propylene glycol backbone cannot be within the range described above. In the nonaqueous electrolyte battery in which a large amount of SEI is generated, the resistance can be increased. When the carbonaceous substance is used as the negative electrode active material, the structure of the negative electrode including the carbonaceous substance itself can be destroyed upon the decomposition reaction of the propylene carbonate. As a result, the capacity can be deteriorated and an additional increase of the resistance can occur.

The production method of the nonaqueous electrolyte battery according to the second embodiment can produce the nonaqueous electrolyte battery according to the first embodiment. As explained above, the nonaqueous electrolyte battery according to the first embodiment can inhibit the self-discharge and the increase of the battery resistance. According to the second embodiment, therefore, the nonaqueous electrolyte battery capable of inhibiting the self-discharge and the increase of the battery resistance can be produced.

EXAMPLE

Embodiments described above will be explained in more detail based on the Examples below.

Example 1

In Example 1, a nonaqueous electrolyte battery 1 shown in FIG. 1 and FIG. 2 was produced as follows:

<Production of Negative Electrode 5>

As a negative electrode active material, powder of lithium titanium composite oxide ($Li_4Ti$) having a spinel structure, capable of absorbing and releasing lithium at a potential of 1.55 V (vs. $Li/Li^+$) was used. A negative electrode mixture was prepared which included 85 parts by weight of the negative electrode active material, 5 parts by weight of graphite and 5 parts by weight of acetylene black as conductive agents, and 5 parts by weight of PVdF as a binder. The negative electrode mixture was added to N-methyl pyrrolidone (NMP) to prepare a slurry for forming a negative electrode. The slurry for forming the negative electrode was produced by performing a slurry dispersion using zirconia beads for 2 hours in an atmosphere whose dew point was −20° C.

The thus prepared slurry for forming the negative electrode was coated on an aluminum foil (a negative electrode current collector 5a) with a thickness of 15 μm. At that time, a part of the negative electrode current collector 5a was left uncoated with the slurry for forming the negative electrode. Next, the negative electrode current collector 5a coated with the slurry for forming the negative electrode was dried, and then the resulting collector was subjected to a press treatment. Thus, a negative electrode 5 including the negative electrode current collector 5a and the negative electrode material layer 5b formed on the negative electrode current collector 5a was obtained.

Next, a negative electrode terminal 8 was connected to the part where no negative electrode material layer 5b was formed on the surface of the thus obtained negative electrode 5.

<Production of Positive Electrode 4>

As a positive electrode active material, powder of lithium nickel cobalt oxide ($LiNi_{0.8}Co_{0.2}O_2$) was used. A positive electrode mixture was prepared which included 91% by weight of the positive electrode active material, 2.5% by weight of acetylene black, 3% by weight of graphite, and 3.5% by weight of polyvinylidene fluoride (PVdF). The positive electrode mixture was added to NMP to prepare slurry for forming a positive electrode.

The slurry for forming the positive electrode was coated on an aluminum foil (a positive electrode current collector 4a) with a thickness of 15 μm. At that time, a part of the positive electrode current collector 4a was left uncoated with the slurry for forming the positive electrode. Next, the positive electrode current collector 4a coated with the slurry for forming the positive electrode was dried, and then the resulting collector was subjected to a press treatment. Thus, a positive electrode 4 including the positive electrode current collector 4a and the positive electrode material layer 4b formed on the positive electrode current collector 4a was obtained.

Next, a positive electrode terminal 7 was connected to the part where no positive electrode material layer 4b was formed on the surface of the thus obtained positive electrode 4.

<Production of Electrode Group 3>

The positive electrode 4 produced as above, a separator 6 of a porous polyethylene film having a thickness of 20 μm, the negative electrode 5 produced as above, and another separator 6 were laminated in this order to obtain a laminate. At that time, as shown in FIG. 2, the lamination was performed so that the positive electrode material layer 4a of the positive electrode 4 faced the negative electrode material layer 5a of the negative electrode 5 through the separator 6. The resulting laminate was spirally wound so that a part of the negative electrode 5 was positioned at the outermost periphery to produce an electrode group assembly. The assembly was heat-pressed at 90° C. to produce a flat electrode group 3 having a width of 58 mm, a height of 95 mm, and a thickness of 3.0 mm, as shown in FIG. 1.

<Housing in Case 2>

Next, a case 2 formed of a laminate film was provided. The laminate film was formed of an aluminum foil having a thickness of 40 μm and polypropylene layers formed on the both surfaces of the aluminum foil, and had a thickness of 0.1 mm.

The electrode group 3 obtained as above was housed in the case 2. At that time, the positive electrode terminal 7 and the negative electrode terminal 8 extended from openings of the case 2. After the electrode group was housed, the inside of the case 2 was dried in vacuum at 80° C. for 24 hours.

<Preparation of Nonaqueous Electrolyte>

Ethylene carbonate (EC) and methyl ethyl carbonate solvent (EMC) were mixed in a volume ratio of 1:4 to prepare a mixed solvent.

Propylene carbonate (PC) was mixed with the mixed solvent in a volume ratio of 1:4 to prepare a nonaqueous solvent. The volume ratio of the propylene carbonate was, accordingly, 20% in the nonaqueous solvent.

Lithium hexafluorophosphate ($LiPF_6$) was dissolved in the thus prepared nonaqueous solvent at a concentration of 1.0 mol/L to obtain a nonaqueous electrolyte. The ratio of the amount of substance for $LiPF_6$ was, accordingly, 100% in the electrolyte included in the nonaqueous electrolyte.

<Injection of Nonaqueous Electrolyte>

The nonaqueous electrolytic solution, prepared as above, was injected to and enclosed in the case 2 including the electrode group 3, thereby producing a battery unit 1.

<Initial Charge and Charge>

The battery unit 1 was charged at a 0.2 C rate until the battery voltage reached 3 V, and then the unit was allowed to stand at 3V for 3 hours as it was. The battery unit was discharged at a 0.2 C rate until the battery voltage reached 1.2 V. The electricity which can be discharge was defined as a chargeable capacity. The discharged battery unit is again charged at a 0.2 C until the battery voltage reached 3 V, and the unit was allowed stand at 3 V for 3 hours as it was. The state of charge of the battery unit 1 in this state was defined as 100%, i.e., it was fully charged. After that, the battery unit 1 was discharged at a 0.2 C rate until the battery voltage reached 1.2 V. Then, the battery unit 1 was charged so that the state of charge was 45%.

<Aging>

The charged battery unit 1 was stored in a thermostatic chamber having a temperature of 60° C. for 48 hours, thereby the aging was performed. Thus, a nonaqueous electrolyte battery 1 was completed.

<Measurement of Initial Discharge Capacity>

Subsequently, the completed nonaqueous electrolyte battery 1 was subjected to a charge-and-discharge cycle at a 0.2 C rate in an atmosphere having a temperature of 30° C., and then the battery was charged again to adjust the state of charge to 50%. At that time, the discharge capacity was measured, and the obtained value was defined as an initial discharge capacity.

<Life Test>

After the initial discharge capacity was measured, the nonaqueous electrolyte battery 1 was adjusted so that the state of charge was 100%, and it was stored in an atmosphere having a temperature of 50° C. The battery was returned to an atmosphere having a temperature of 30° C. every 5 days, and the charge and discharge were performed again, whereby the capacity was confirmed. The charge and storage were repeated until the confirmed capacity reached 80% of the initial charge and discharge capacity. When the discharge capacity of the nonaqueous electrolyte battery 1 reached 80% of the initial discharge capacity, the storage was stopped.

The nonaqueous electrolyte battery 1 having a discharge capacity of 80% of the initial discharge capacity was charged so that the state of charge was 100%, and then the battery was discharged at a 1 C rate until the battery voltage reached 1.2 V. Subsequently, the nonaqueous electrolyte battery 1 was charged again so that the state of charge reached 100%, and then the battery was discharged at a 10 C rate in the same manner as above. A ratio of the discharge capacity at a 10 C rate to the discharge capacity at a 1 C rate was defined as a rate characteristic.

The nonaqueous electrolyte battery 1 of Example 1 had a rate characteristic of 0.75.

<Confirmation of Formation of Coating Film>

Using the Nonaqueous Electrolyte Battery 1 after the aging and the nonaqueous electrolyte battery 1 after the rate characteristic was obtained, XPS measurements were performed in accordance with the method explained above. As for the nonaqueous electrolyte battery 1 after the rate characteristic was obtained, the measurement was performed after the charge was performed so that the state of charge was 50%. While etching was performed, an analysis was performed in a depth direction to obtain a depth profile of each of Li, C, O, F, and P.

In the nonaqueous electrolyte battery 1 whose discharge capacity was 80% of the initial discharge capacity, a relative value of the C element in the vicinity of the surface of the negative electrode material layer 5b was increased, compared to the nonaqueous electrolyte battery 1 after the aging. From this result, it was confirmed that the nonaqueous electrolyte battery 1 whose discharge capacity of 80% or more of the initial discharge capacity had an organic coating film on the negative electrode 5 which had grown more than that in the nonaqueous electrolyte battery 1 after the aging.

<Quantity of Coating Film Component>

Using the nonaqueous electrolyte battery 1 after the aging and the nonaqueous electrolyte battery 1 after the rate characteristic was obtained, the content of the compound having the propylene glycol backbone per g of the weight of the negative electrode material layer 5b in the coating film was measured in accordance with the method explained above. As for the nonaqueous electrolyte battery 1 after the rate characteristic was obtained, the measurement was performed after the charge was performed so that the state of charge was 50%. As an internal standard substance, maleic acid was used. As a result, it was found that the nonaqueous electrolyte battery 1 after the aging had a content of the compound having the propylene glycol (PG) backbone in the coating film of 10 μmol per g of the weight of the negative electrode material layer 5b. On the other hand, it was found that the nonaqueous electrolyte battery 1 after the rate characteristic was obtained had a content of the compound having the propylene glycol (PG) backbone in the coating film of 24 μmol per g of the weight of the negative electrode material layer 5b.

Example 2

A nonaqueous electrolyte battery 1 was produced in the same manner as in Example 1 except that a volume ratio of the propylene carbonate was adjusted to 10% in the nonaqueous solvent when the nonaqueous solvent was prepared.

Example 3

A nonaqueous electrolyte battery 1 was produced in the same manner as in Example 1 except that lithium hexafluorophosphate ($LiPF_6$) and lithium tetrafluoroborate ($LiBF_4$) were dissolved in the nonaqueous solvent respectively in concentrations of 0.9 mol/L and 0.1 mol/L as the electrolyte to obtain a nonaqueous electrolyte. In the nonaqueous electrolyte battery 1, accordingly, the nonaqueous electrolyte had a ratio of the amount of substance for $LiPF_6$ of 90%.

Example 4

A nonaqueous electrolyte battery 1 was produced in the same manner as in Example 1 except that lithium hexafluorophosphate ($LiPF_6$) and lithium hexafluoroarsenate ($LiAsF_6$) were dissolved respectively in the nonaqueous solvent in concentrations of 0.9 mol/L and 0.1 mol/L as the electrolyte to obtain a nonaqueous electrolyte. In the nonaqueous electrolyte battery 1, accordingly, the nonaqueous electrolyte had a ratio of the amount of substance for $LiPF_6$ of 90%.

Example 5

A nonaqueous electrolyte battery 1 was produced in the same manner as in Example 1 except that the aging was performed at 70° C. for 48 hours.

Example 6

A nonaqueous electrolyte battery 1 was produced in the same manner as in Example 1 except that the aging was performed at 60° C. for 96 hours.

Comparative Examples 1 and 2

A nonaqueous electrolyte battery was produced in the same manner as in Example 1 except that volume ratios of the propylene carbonate (PC) were adjusted to respectively 0% and 60% in the nonaqueous solvent when the nonaqueous solvent was prepared.

Comparative Example 3

A nonaqueous electrolyte battery was produced in the same manner as in Example 1 except that lithium hexafluorophosphate ($LiPF_6$) and lithium tetrafluoroborate ($LiBF_4$) were dissolved in the nonaqueous solvent respectively in concentrations of 0.5 mol/L and 0.5 mol/L as the electrolyte to obtain a nonaqueous electrolyte. In the nonaqueous electrolyte battery, accordingly, the nonaqueous electrolyte had a ratio of the amount of substance for $LiPF_6$ of 50%.

Comparative Example 4

A nonaqueous electrolyte battery was produced in the same manner as in Example 1 except that lithium hexafluorophosphate ($LiPF_6$) and lithium hexafluoroarsenate ($LiAsF_6$) were dissolved respectively in the nonaqueous solvent in concentrations of 0.5 mol/L and 0.5 mol/L as the electrolyte to obtain a nonaqueous electrolyte. In the nonaqueous electrolyte battery, accordingly, the nonaqueous electrolyte had a ratio of the amount of substance for $LiPF_6$ of 50%.

Comparative Example 5

A nonaqueous electrolyte battery was produced in the same manner as in Example 1 except that the aging was performed at 90° C. for 48 hours.

Comparative Example 6

A nonaqueous electrolyte battery was produced in the same manner as in Example 1 except that the aging was performed at 60° C. for 200 hours.

Comparative Example 7

A nonaqueous electrolyte battery was produced in the same manner as in Example 1 except that graphite was used as the negative electrode active material, and the upper limit of the charge voltage was changed to 4.2 V and the lower limit of the discharge voltage was changed to 3.0 V in the initial charge and discharge.

<Results>

As for the nonaqueous electrolyte batteries 1 from Examples 2 to 6, and the nonaqueous electrolyte batteries from Comparative Examples 1 to 7, the content of the compound having the propylene glycol backbone (the PG backbone content) per g of the weight of the negative electrode material layer 5b and the rate characteristic (the output characteristic) were measured in the same manner as in Example 1. The results are shown in Table 1 below together with the production conditions of the nonaqueous electrolyte battery 1 from each of Examples and Comparative Examples.

TABLE 1

| | Active material | Volume Ratio of PC in Nonaqueous Solvent | Ratio of Amount of Substance for $LiPF_6$ in Electrolyte | Electrolyte mixed with $LiPF_6$ | Aging Condition Temp. | Aging Condition Time | Content of Compound having PG Backbone included in Coating film after Rate Characteristic was obtained | Rate Characteristic (Output Characteristic) |
|---|---|---|---|---|---|---|---|---|
| | — | % | % | — | ° C. | hours | μmol/(per g of weight of negative electrode material layer 5b) | (No unit) |
| Example 1 | LTO | 20 | 100 | — | 60 | 48 | 24 | 0.75 |
| Example 2 | LTO | 10 | 100 | — | 60 | 48 | 18 | 0.71 |
| Example 3 | LTO | 20 | 90 | $LiBF_4$ | 60 | 48 | 12 | 0.81 |
| Example 4 | LTO | 20 | 90 | $LiAsF_6$ | 60 | 48 | 16 | 0.79 |
| Example 5 | LTO | 20 | 100 | — | 70 | 48 | 32 | 0.73 |
| Example 6 | LTO | 20 | 100 | — | 60 | 96 | 37 | 0.7 |
| Comparative Example1 | LTO | 0 | 100 | — | 60 | 48 | 0.5 | 0.43 |
| Comparative Example2 | LTO | 60 | 100 | — | 60 | 48 | 45 | 0.39 |
| Comparative Example3 | LTO | 20 | 60 | $LiBF_4$ | 60 | 48 | 68 | 0.51 |
| Comparative Example4 | LTO | 20 | 60 | $LiAsF_6$ | 60 | 48 | 72 | 0.48 |
| Comparative Example5 | LTO | 20 | 100 | — | 90 | 48 | 76 | 0.46 |
| Comparative Example6 | LTO | 20 | 100 | — | 60 | 200 | 49 | 0.62 |
| Comparative Example7 | Graphite | 20 | 100 | — | 60 | 48 | 198 | — |

From the results shown in Table 1, it was found that the nonaqueous electrolyte batteries 1 from Examples 1 to 6 were more excellent in the rate characteristic than the nonaqueous electrolyte batteries from Comparative Examples 1 to 7.

This is because in the nonaqueous electrolyte batteries 1 from Examples 1 to 7, the coating film formed on the negative electrode material layer 5b included the compound having the propylene glycol backbone in a content of 2 μmol to 40 μmol per g of the weight of the negative electrode material layer 5b, and thus the self-discharge could be inhibited while the increase of the battery resistance was inhibited.

On the other hand, it can be considered that in the nonaqueous electrolyte battery of the Comparative Example 1, the content of the compound having the propylene glycol backbone formed was too low, and thus the self-discharge could be insufficiently inhibited; as a result the discharge capacity at the 10 C rate was remarkably lower than the discharge capacity at the 1 C rate.

In Comparative Examples 2 to 6, it can be considered that the compound having the propylene glycol backbone was excessively formed, and thus the increase of the battery resistance could be insufficiently inhibited; as a result, the rate characteristic was low.

In Comparative Example 7, it can be considered that because graphite, which is a carbonaceous substance, was used as the negative electrode active material, a large amount of coating film, owing to decomposition of propylene carbonate, was formed on the carbon negative electrode, and thus the resistance was increased to the extent at which the rate characteristic could not substantially be measured.

From the comparison of Examples 1 and 2 with Comparative Example 1, it is found that when the propylene carbonate content is too low in the nonaqueous solvent when the nonaqueous electrolyte is prepared, the coating film including the compound having the propylene glycol backbone is insufficiently formed. In addition, from the comparison of Examples 1 and 2 with Comparative Example 2, it is found that when the propylene carbonate content is too high in the nonaqueous solvent when the nonaqueous electrolyte is prepared, the coating film including the compound having the propylene glycol backbone is excessively formed.

From the comparison of Examples 1, 3 and 4, it is found that even if a plurality of electrolytes are used, when the content of $LiPF_6$ dissolved in the nonaqueous solvent is 70 mol % or more in the electrolyte, the coating film formed on the negative electrode material layer 5b can include the compound having the propylene glycol backbone in an amount of 2 to 40 μmol per g of the weight of the negative electrode material layer 5b. In addition, from the comparison of the results of Examples 3 and 4, it is found that even if the electrolyte to be mixed with $LiPF_6$ is changed, the same effects can be obtained.

On the other hand, from the results of Comparative Examples 3 and 4, when the content of $LiPF_6$ is less than 70% by mol in the electrolyte dissolved in the nonaqueous solvent, an excessive coating film is formed on the negative electrode material layer, thus resulting in lowering of the rate characteristic.

From the results of Comparative Example 5, it is found that when the temperature in the aging is too high, the coating film including the compound having the propylene glycol backbone is excessively formed, thus resulting in a worsened rate characteristic. It can be considered that this occurs because the aging temperature at which the initial coating film can possibly be formed is too high, and the nonaqueous electrolyte may be excessively decomposed. Similarly, from the results of Comparative Example 6, when the aging time is too long, the growth of the coating film is excessively promoted, thus resulting in a worsened rate characteristic.

Example 7 to Example 12

In Examples 7 to 12, nonaqueous electrolyte batteries 1 were produced in the same manner as in Example 1 except that lithium hexafluorophosphate ($LiPF_6$) and an electrolyte shown in Table 2 below were dissolved in the nonaqueous solvent respectively in concentrations of 0.9 mol/L and 0.1 mol/L as the electrolyte to obtain nonaqueous electrolytes. In the nonaqueous electrolyte batteries 1 from Examples 7 to 12, accordingly, each of the nonaqueous electrolyte had a ratio of the amount of substance for $LiPF_6$ of 90%.

<Results>

As for the nonaqueous electrolyte batteries 1 of Examples 7 to 12, the content of the compound having the propylene glycol backbone (the PG backbone content) per g of the weight of the negative electrode material layer 5b and the rate characteristic (the output characteristic) were measured in the same manner as in Example 1. The results are shown in Table 2 below together with the production conditions of the nonaqueous electrolyte battery 1 from each Example.

TABLE 2

| | Active material | Volume Ratio of PC in Nonaqueous Solvent | Ratio of Amount of Substance for $LiPF_6$ in Electrolyte | Electrolyte mixed with $LiPF_6$ | Aging Condition | | Content of Compound having PG Backbone included in Coating film after Rate Characteristic was obtained | Rate Characteristic (Output Characteristic) |
|---|---|---|---|---|---|---|---|---|
| | | | | | Temp. | Time | | |
| Unit | — | % | % | — | °C. | hours | μmol/(per g of weight of negative electrode material layer 5b) | (No unit) |
| Example 7 | LTO | 20 | 90 | $Li_2B(C_2O_4)_2$ | 60 | 48 | 10 | 0.83 |
| Example 8 | LTO | 20 | 90 | $LiF_2BC_2O_4$ | 60 | 48 | 14 | 0.80 |
| Example 9 | LTO | 20 | 90 | $LiClO_4$ | 60 | 48 | 19 | 0.73 |
| Example 10 | LTO | 20 | 90 | LiTFSI | 60 | 48 | 26 | 0.72 |
| Example 11 | LTO | 20 | 90 | LiBETI | 60 | 48 | 18 | 0.73 |
| Example 12 | LTO | 20 | 90 | $Li_2P_2O_2$ | 60 | 48 | 20 | 0.79 |

From the comparison of results in Tables 1 and 2, it was found that the nonaqueous electrolyte batteries 1 of Examples 7 to 12 were also more excellent in the rate characteristic than the nonaqueous electrolyte batteries from Comparative Examples 1 to 7, as the nonaqueous electrolyte batteries 1 of Examples 1 to 6. This occurs for the same reasons that the nonaqueous electrolyte batteries 1 of Examples 1 to 6 were excellent in the rate characteristic.

In addition, from the comparison of the results in Examples 1, 3, 4, and 7 to 12, it is found that even if a plurality of electrolytes were used, when the content of LiPF$_6$ dissolved in the nonaqueous solvent is 70 mol % or more in the electrolyte, the coating film formed on the negative electrode material layer 5b can include the compound having the propylene glycol backbone in an amount of 2 to 40 µmol per g of the weight of the negative electrode material layer 5b. In addition, it is found that in particular the nonaqueous electrolyte batteries 1 from Examples 3, 7 and 8 are remarkably excellent in the rate characteristic. From those results, it is found that when the electrolyte to be mixed with LiPF$_6$ includes boron, the coating film amount can be adjusted to a more preferable range, and thus the rate characteristic can be improved. It is found, accordingly, that it is more preferable that the coating film formed on the negative electrode material layer 5b includes the compound having the propylene glycol backbone in an amount of 10 to 14 µmol per g of the weight of the negative electrode material layer 5b.

According to at least one embodiment and Examples as explained above, the nonaqueous electrolyte battery capable of inhibiting the self-discharge and the increase of the battery resistance can be provided, because the negative electrode material layer including the negative electrode active material capable of absorbing and releasing lithium at a potential of 0.78 V (vs. Li/Li$^+$) or more, and the coating film including the compound having the propylene glycol backbone in an amount of 2 µmol to 40 µmol per g of the weight of the negative electrode material layer are included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
   a positive electrode;
   a negative electrode which comprises a negative electrode current collector and a negative electrode material layer formed on the negative electrode current collector, wherein the negative electrode material layer comprises a negative electrode active material capable of absorbing and releasing lithium at a potential of 0.78 V (vs. Li/Li$^+$) or more; and
   a nonaqueous electrolyte,
   wherein
   a film comprising a compound having a propylene glycol backbone is formed on at least a part of a surface of the negative electrode material layer;
   a content of the compound having the propylene glycol backbone in the film is from 2 µmol to 40 µmol per g of a weight of the negative electrode material layer; and
   the compound having the propylene glycol backbone is represented by the following formula (2):

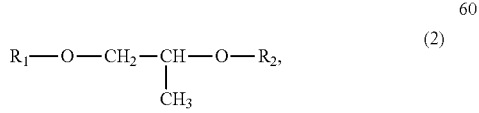

(2)

wherein R$_1$ and R$_2$ are the same or different, and are selected from the group consisting of an alkyl group, a hydroxyl group, an alkyl lithium group, and an ester compound of phosphoric acid and lithium.

2. The nonaqueous electrolyte battery according to claim 1, wherein the negative electrode active material comprises a lithium titanate having a spinel structure.

3. The nonaqueous electrolyte battery according to claim 1, wherein the nonaqueous electrolyte comprises a nonaqueous solvent, the nonaqueous solvent comprises propylene carbonate, and a content of the propylene carbonate in the nonaqueous solvent is from 5% by volume to 50% by volume relative to the volume of the nonaqueous solvent.

4. The nonaqueous electrolyte battery according to claim 1, wherein the film further comprises a compound having an alkoxyl group.

5. The nonaqueous electrolyte battery according to claim 1, wherein the nonaqueous electrolyte comprises a nonaqueous solvent and an electrolyte dissolved in the nonaqueous solvent, the electrolyte comprises LiPF$_6$, and a content of the LiPF$_6$ in the electrolyte is 70 mol % or more of the electrolyte.

6. The nonaqueous electrolyte battery according to claim 5, wherein the electrolyte further comprises at least one selected from the group consisting of lithium perchlorate (LiClO$_4$), lithium tetrafluoroborate (LiBF$_4$), lithium hexafluoroarsenate (LiAsF$_6$), lithium trifluoromethanesulfonate (LiCF$_3$SO$_3$), lithium bistrifluoromethylsulfonyl imide [LiN(CF$_3$SO$_2$)$_2$], lithium N,N-bis(trifluoromethanesulfonyl)imide (LiTFSI), lithium N,N-bispentafluoroethanesulfonyl amide (LiBETI), lithium bis(fluorosulfonyl)imide (LiFSI), lithium difluorophosphate (LiPF$_2$O$_2$), lithium monofluorophosphate (LiPFO$_3$H), lithium bisoxalatoborate (LiB(C$_2$O$_4$)$_2$), lithium difluoro(oxalato)borate (LiF$_2$BC$_2$O$_4$), and lithium difluoro(trifluoro-2-oxide-2-trifluoro-methylpropionato(2-)-0,0)borate (LiBF$_2$(OCOOC(CF$_3$)$_2$).

7. The nonaqueous electrolyte battery according to claim 5, wherein the electrolyte further comprises at least one lithium salt comprising boron.

8. The nonaqueous electrolyte battery according to claim 5, wherein the electrolyte further comprises at least one selected from the group consisting of lithium N,N-bis(trifluoromethanesulfonyl)imide (LiTFSI), lithium N,N-bispentafluoroethanesulfonyl amide (LiBETI), lithium bis(fluorosulfonyl)imide (LiFSI), lithium difluorophosphate (LiPF$_2$O$_2$), lithium monofluorophosphate (LiPFO$_3$H), lithium bisoxalatoborate (LiB(C$_2$O$_4$)$_2$), lithium difluoro(oxalato)borate (LiF$_2$BC$_2$O$_4$), and lithium difluoro(trifluoro-2-oxide-2-trifluoro-methylpropionato(2-)-0,0)borate (LiBF$_2$(OCOOC(CF$_3$)$_2$).

9. A nonaqueous electrolyte battery comprising:
   a positive electrode;
   a negative electrode which comprises a negative electrode current collector and a negative electrode material layer formed on the negative electrode current collector, wherein the negative electrode material layer comprises a negative electrode active material capable of absorbing and releasing lithium at a potential of 0.78 V (vs. Li/Li$^+$) or more; and
   a nonaqueous electrolyte,
   wherein
   a film comprising a compound having a propylene glycol backbone is formed on at least a part of a surface of the negative electrode material layer;
   a content of the compound having the propylene glycol backbone in the film is from 2 µmol to 40 µmol per g of a weight of the negative electrode material layer; and the compound having the propylene glycol backbone is represented by the following formula (2):

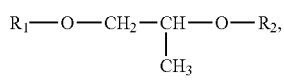

(2)

wherein $R_1$ and $R_2$ are different, and are selected from the group consisting of an alkyl group, a carbonyl group, a hydroxyl group, an alkyl lithium group, and an ester compound of phosphoric acid and lithium.

10. The nonaqueous electrolyte battery according to claim 9, wherein the negative electrode active material comprises a lithium titanate having a spinel structure.

11. The nonaqueous electrolyte battery according to claim 9, wherein the nonaqueous electrolyte comprises a nonaqueous solvent, the nonaqueous solvent comprises propylene carbonate, and a content of the propylene carbonate in the nonaqueous solvent is from 5% by volume to 50% by volume relative to the volume of the nonaqueous solvent.

12. The nonaqueous electrolyte battery according to claim 9, wherein the film further comprises a compound having an alkoxyl group.

13. The nonaqueous electrolyte battery according to claim 9, wherein the nonaqueous electrolyte comprises a nonaqueous solvent and an electrolyte dissolved in the nonaqueous solvent, the electrolyte comprises $LiPF_6$, and a content of the $LiPF_6$ in the electrolyte is 70 mol % or more of the electrolyte.

14. The nonaqueous electrolyte battery according to claim 13, wherein the electrolyte further comprises at least one selected from the group consisting of lithium perchlorate ($LiClO_4$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonyl imide [$LiN(CF_3SO_2)_2$], lithium N,N-bis(trifluoromethanesulfonyl)imide (LiTFSI), lithium N,N-bispentafluoroethanesulfonyl amide (LiBETI), lithium bis(fluorosulfonyl)imide (LiFSI), lithium difluorophosphate ($LiPF_2O_2$), lithium monofluorophosphate ($LiPFO_3H$), lithium bisoxalatoborate ($LiB(C_2O_4)_2$), lithium difluoro(oxalato)borate ($LiF_2BC_2O_4$), and lithium difluoro(trifluoro-2-oxide-2-trifluoro-methylpropionato(2-)-0,0)borate ($LiBF_2(OCOOC(CF_3)_2)$).

15. The nonaqueous electrolyte battery according to claim 13, wherein the electrolyte further comprises at least one lithium salt comprising boron.

16. The nonaqueous electrolyte battery according to claim 13, wherein the electrolyte further comprises at least one selected from the group consisting of lithium N,N-bis(trifluoromethanesulfonyl)imide (LiTFSI), lithium N,N-bispentafluoroethanesulfonyl amide (LiBETI), lithium bis(fluorosulfonyl)imide (LiFSI), lithium difluorophosphate ($LiPF_2O_2$), lithium monofluorophosphate ($LiPFO_3H$), lithium bisoxalatoborate ($LiB(C_2O_4)_2$), lithium difluoro(oxalato)borate ($LiF_2BC_2O_4$), and lithium difluoro(trifluoro-2-oxide-2-trifluoro-methylpropionato(2-)-0,0)borate ($LiBF_2(OCOOC(CF_3)_2)$).

* * * * *